US007922376B2

(12) United States Patent
Tatara et al.

(10) Patent No.: US 7,922,376 B2

(45) Date of Patent: Apr. 12, 2011

(54) HEADLAMP FOR VEHICLE

(75) Inventors: Naohisa Tatara, Shizuoka (JP); Masahito Naganawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 147 days.

(21) Appl. No.: 12/481,200

(22) Filed: Jun. 9, 2009

(65) Prior Publication Data

US 2009/0310378 A1 Dec. 17, 2009

(30) Foreign Application Priority Data

Jun. 11, 2008 (JP) ................................ 2008-152448

(51) Int. Cl.
*B60Q 1/00* (2006.01)

(52) U.S. Cl. ......... 362/539; 362/507; 362/509; 362/319

(58) Field of Classification Search .................. 362/507, 362/509, 512, 319, 538, 539
See application file for complete search history.

(56) References Cited

U.S. PATENT DOCUMENTS

| | | | | |
|---|---|---|---|---|
| 7,090,385 | B2 * | 8/2006 | Sugimoto | 362/539 |
| 2005/0024889 | A1 * | 2/2005 | Sugimoto | 362/539 |
| 2006/0039158 | A1 * | 2/2006 | Kurz et al. | 362/539 |
| 2006/0120096 | A1 * | 6/2006 | Naganawa et al. | 362/539 |

FOREIGN PATENT DOCUMENTS

JP 2006-202694 A 8/2006

* cited by examiner

*Primary Examiner* — Ali Alavi

(74) *Attorney, Agent, or Firm* — Osha • Liang LLP

(57) ABSTRACT

A headlamp for a vehicle has a projection lens, a light source disposed behind a rear focal point of the projection lens and having an optical axis extending in a longitudinal direction, a reflector which reflects light from the light source toward the projection lens, and a rotary shade which is rotatable and shields a part of the light which is projected from the light source and reflected by the reflector. The rotary shade has a plurality of pattern forming sections, each of which respectively forms a corresponding light distribution pattern including an upper part irradiation pattern and a lower part irradiation pattern. A center of the lower part irradiating patterns is located lower than a horizontal line. A center of the upper part irradiating patterns is located above the horizontal line. The pattern forming sections form at least four different upper part irradiating patterns.

15 Claims, 5 Drawing Sheets

HEADLAMP FOR VEHICLE

BACKGROUND OF INVENTION

1. Field of the Invention

The present invention relates to a headlamp for a vehicle and, more particularly, to a headlamp providing an enhanced visibility.

2. Related Art

In some headlamps for a vehicle, for example, a lamp unit having a light source is disposed in an outer housing of a lighting device constituted by a cover and a lamp housing.

For example, there is a projector type lamp unit for a vehicle having a projection lens for forward projecting a light emitted from a light source, a reflector for reflecting the light emitted from the light source toward the projection lens side, and a shade for shielding a part of the light reflected by the reflector.

In some projector type lamp units, for example, a rotary shade, which is rotatable around its rotary axis extending in a vehicle width direction, is employed (see Japanese Patent Unexamined Publication JP-A-2006-202694).

In a headlamp for a vehicle described in the JP-A-2006-202694, the rotary shade is rotated between a shielding position and a shield resting position. A low beam light distribution pattern, which lights a position at a short distance, is formed when light is emitted from the light source while the rotary shade is placed in the shielding position, and a light distribution pattern for a high beam, which lights a position at a long distance, is formed when the light is emitted from the light source while the rotary shade being placed in the shield resting position.

The light distribution pattern for the low beam is formed by two patterns including a pattern for mainly lighting a road surface and an overhead irradiating pattern for mainly lighting a road sign thereabove.

The light distribution pattern for a high beam is formed by a single pattern, and the light is mainly irradiated on the road surface by a light turned downward in a horizontal direction and the light is mainly irradiated on the road sign by a light turned upward in the horizontal direction.

In the conventional headlamp for a vehicle of the JP-A-2006-202694, however, the overhead irradiating pattern is not changed depending on a running state, for example, a state where a vehicle runs over an ordinary road or a state where the vehicle runs over a highway. In some cases, therefore, visibility for a road sign is poor depending on the running state.

Moreover, because the overhead irradiating pattern is not formed depending on the running state, there is a fear that a light forming the overhead irradiating pattern might be a dazzling light for other vehicles, such as cars running ahead.

SUMMARY OF INVENTION

In view of the above, one or more embodiments of the present invention enhance a visibility for a road sign and prevent a dazzling light for other vehicles.

According to one or more embodiments of the present invention, there is provided a headlamp for a vehicle including a projection lens; a light source disposed behind a rear focal point of the projection lens and having an optical axis extending in a longitudinal direction; a reflector which reflects light from the light source toward the projection lens; and a rotary shade which is rotatable and shields a part of the light projected from the light source and reflected by the reflector, wherein the rotary shade includes a plurality of pattern forming sections each of which respectively forms a corresponding light distribution pattern including an upper part irradiation pattern and a lower part irradiation pattern, wherein a center of the lower part irradiating patterns is located lower than a horizontal line, and wherein a center of the upper part irradiating patterns is located above the horizontal line.

Further, according to one or more embodiments of the invention, it is adaptable that the pattern forming sections form at least four different upper part irradiating patterns. Note that the four different upper part irradiating patterns are: a pattern which does not irradiate any light on an upper part as shown in FIG. 2B; a pattern which fully lightens upper part as shown in FIG. 5B; and two different patterns which partly irradiate light on the upper part as shown in FIGS. 3B and 4B.

Further, according to one or more embodiments of the invention, it is adaptable that the respective pattern forming sections of the rotary shade includes a plurality of projections and reflecting surfaces both of which extend in a rotary axis thereof and provided along a circumferential direction thereof, each of the respective projections shields a part of the light emitted from the light source to form the respective lower part irradiating patterns, each of the respective reflecting surfaces reflects a part of the light emitted from the light source to form the respective upper part irradiating patterns, and respective pairs of the projection and the reflecting surface form the respective light distribution patterns.

Furthermore, it is adaptable that the respective upper part irradiation patterns in the light distribution patterns are different from each other.

Still further, it is adaptable that the light distribution patterns are switched in accordance with a running state of the vehicle.

Accordingly, it is possible to enhance a visibility for the road sign irrespective of the running state of the vehicle and to prevent a dazzling light from being generated for other vehicles.

Other aspects and advantages of the present invention will be apparent from the following description, the drawings, and the claims.

DETAILED DESCRIPTION

Exemplary embodiments of the present invention will be described below with reference to the accompanying drawings.

Headlamps 1, 1 for a vehicle are attached to both left and right sides of a front end of a body, respectively.

Figure 1:
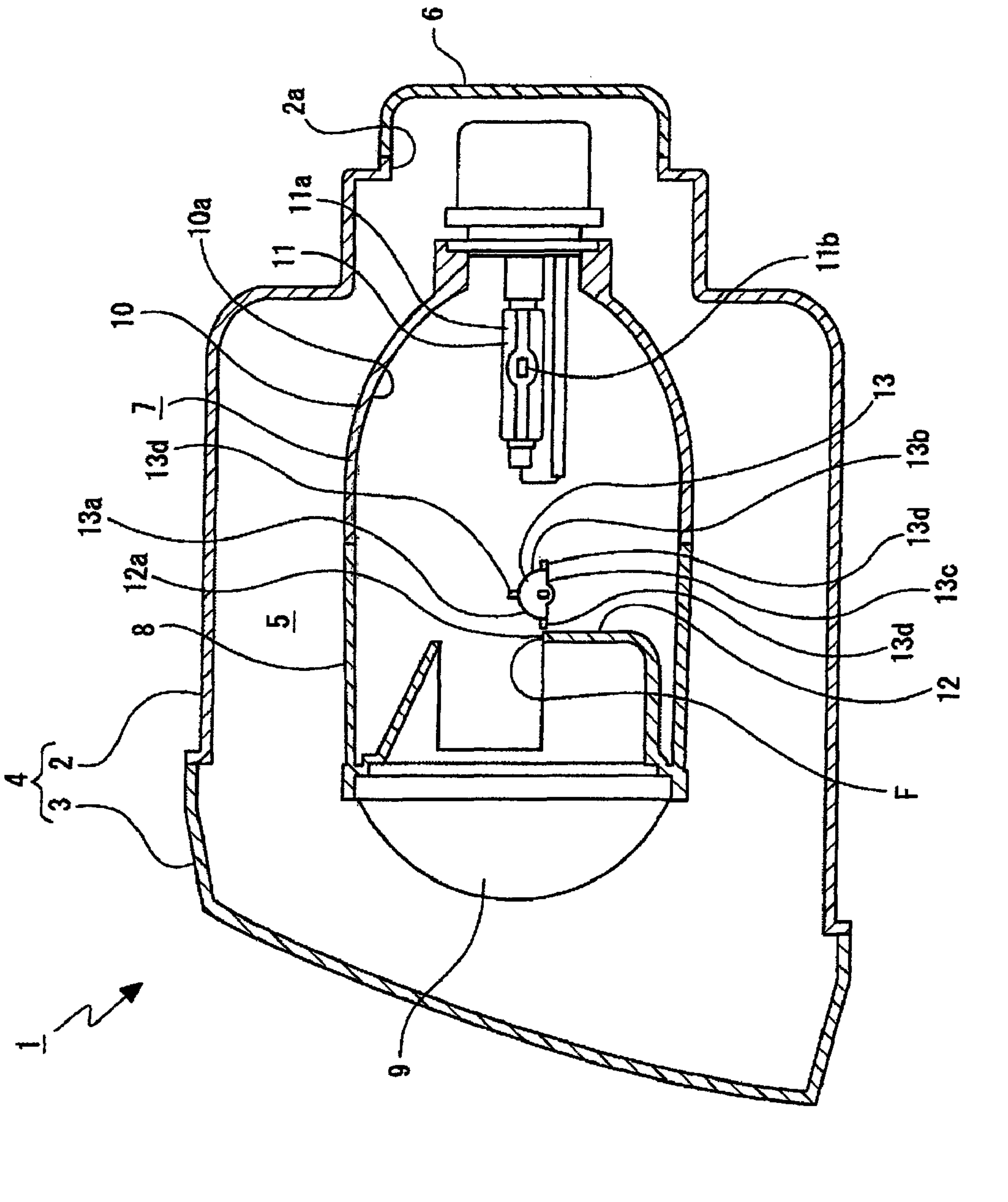
FIG. 1 is a schematically longitudinal sectional view showing a headlamp for a vehicle according to the invention.

The headlamp 1 for a vehicle includes a lighting device outer housing 4 having a lamp housing 2 and a cover 3. The lamp housing 2 is a concave shape having an opening at the front side, and the cover 3 closes the opening of the lamp housing 2 as shown in FIG. 1. An internal space of the lighting device outer housing 4 is formed as a lighting chamber 5.

An attaching hole 2*a* penetrating longitudinally is formed on a rear end of the lamp housing 2. A back cover 6 is attached to the attaching hole 2*a*.

A lamp unit 7 is disposed in the lighting chamber 5. The lamp unit 7 has a lens holder 8, a projection lens 9 attached to a front end of the lens holder 8, a reflector 10 attached to a rear side of the lens holder 8, and a light source 11 attached to a rear end of the reflector 10.

The lamp unit 7 is supported on the lamp housing 2 through an optical axis adjusting mechanism (not shown). By operating the optical axis adjusting mechanism, it is possible to move the lamp unit 7 with respect to the lamp housing 2 in a vertical direction or a transverse direction, thereby carrying out an optical axis adjustment (an aiming adjustment or a leveling adjustment) of a light emitted from the light source.

The lens holder 8 is formed in an almost cylindrical shape having a hollow portion that extends in a longitudinal direction of a vehicle. The lens holder 8 is supported on a support member (not shown) rotatably in a horizontal direction. Accordingly, the lamp unit 7 having the lens holder 8 is rotatable in a horizontal direction (a left-and-right direction) with respect to the lighting device outer housing 4.

A rotation of the lamp unit 7 in the transverse direction with respect to the lighting device outer housing 4 is carried out interlockingly with a steering operation of a driver.

In the projection lens 9, a front side surface is convex surface, and a rear side surface is a flat surface. The projection lens 9 has a function for inverting an image on a focal plane including a rear focal point F and projecting the inverted image forward.

The reflector 10 has an internal surface formed as a reflecting surface 10*a*, and the reflecting surface 10*a* is formed to be an almost elliptically spherical surface except for a front end, for example. The reflecting surface 10*a* is formed in such a manner that a first focal point is coincident with a light emitting portion of the light source 11 which will be described below and a second focal point is coincident with the rear focal point F of the projection lens 9.

The light source 11 is a discharge valve, for example, and emits a light from a light emitting portion 11*b* provided in an outer tube 11*a*. The light emitted from the light emitting portion 11*b* is transmitted forward or is reflected by the reflecting surface 10*a* of the reflector 10. Then, the light is collected on the focal plane including the rear focal point F of the projection lens 9, and is projected as an illuminating light forward by the projection lens 9.

A fixed shade 12 is provided between the projection lens 9 and the light source 11 in the lamp unit 7. The fixed shade 12 has an upper edge 12*a* which is coincident with the rear focal point F of the projection lens 9. The light emitted from the light source 11 and transmitted toward an upper side is shielded by the fixed shade 12.

A rotary shade 13 is disposed near the upper edge 12*a* of the fixed shade 12 in the lamp unit 7. The rotary shade 13 has an elongated shape extending in a width direction of a vehicle and is made rotatable around the rotational axis extending in the width direction of the vehicle.

The rotary shade 13 is an almost semi-cylindrical shape, and a first pattern forming section, a second pattern forming section, and a third pattern forming section are provided on an outer peripheral surface thereof. The first pattern forming section has a first reflecting surface 13*a* and a first protrusion 13*d*, the second pattern forming section has a second reflecting surface 13*b* and a second protrusion 13*d*, and the third pattern forming section has a third reflecting surface 13*c* and a third protrusion 13*d*. The first, second, and third reflecting surfaces 13*a*, 13*b*, 13*c* are disposed separately from each other in a circumferential direction thereof by interposing respective first through third protrusions 13*d* therebetween. The first through third protrusions protrude radially outwardly.

According to this structure, light distribution patterns are switched by rotating the rotary shade 13 depending on the running state.

As the light distribution patterns, in this exemplary embodiment, four patterns are formed depending on the running state of the vehicle. The four patterns include a town pattern, a basic pattern, a motorway pattern, and a high beam pattern. The town pattern, the basic pattern, and the motorway pattern belong to a low beam light distribution pattern.

The town pattern is used when the vehicle runs in a low speed in an urban area, the basic pattern is used when the vehicle runs on an ordinary road, and the motorway pattern is used when the vehicle runs on a highway, for example. The high beam pattern is used to irradiate light on a distant location. Each of the patterns is switched through a pattern changeover switch operated by a driver, for example.

Figure 2A:
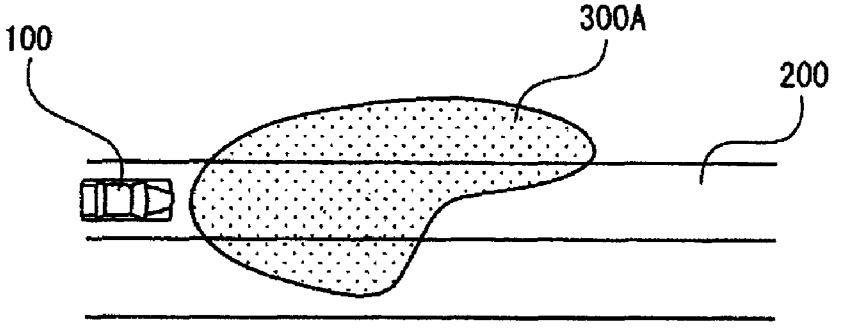
FIG. 2A shows an irradiating state on a road surface in a town pattern of a low beam light distribution pattern.
Figure 2B:
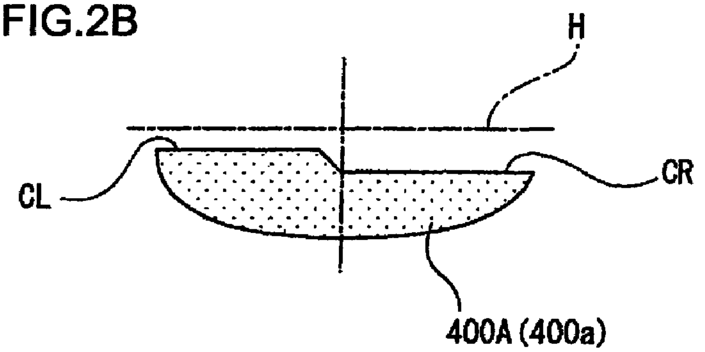
FIG. 2B shows a cutoff line layout of the town pattern.
Figure 2C:
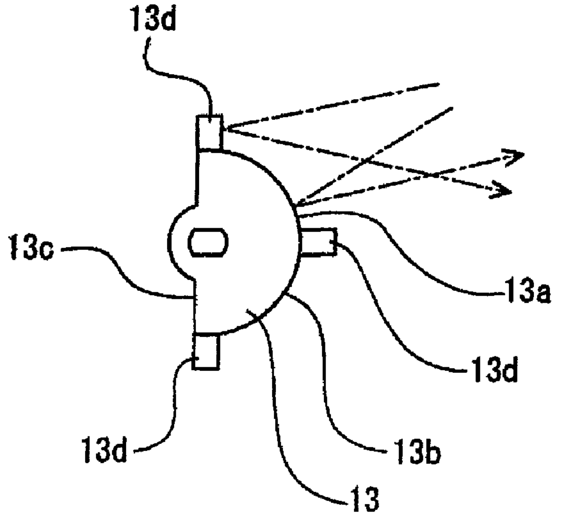
FIG. 2C shows a state of the rotary shade in the town pattern.

FIGS. 2A through 2C relate to the town pattern of the low beam light distribution pattern.

When the rotary shade 13 is rotated as shown in FIG. 2C, the town pattern is formed. In the town pattern, a road surface is irradiated as an irradiated state 300A shown in FIG. 2A, and a cutoff line layout is formed as 400A (400*a*) shown in FIG. 2B.

As shown in FIG. 2B, cutoff lines CL (left side cutoff line) and CR (right side cutoff line) of the light distribution pattern 400A are positioned below a horizontal line H, so that center of the lower part irradiating pattern is located lower than the horizontal line H.

The light emitted from the light source 11 is partially shielded by each portion of the rotary shade 13, and a second irradiation pattern (referred to as a so-called overhead sign pattern), which mainly lights a road sign, is not formed.

Accordingly, the first irradiation pattern 400A is constituted by only a single first irradiation pattern 400*a* for mainly lightening on the road surface 200.

Figure 3A:
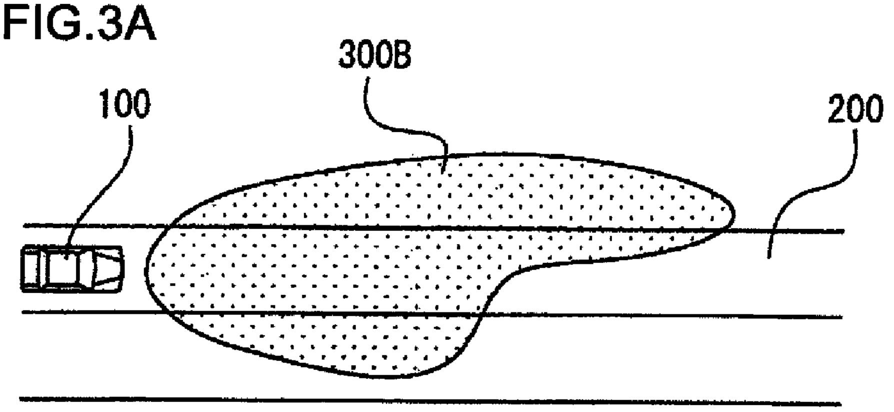
FIG. 3A shows an irradiating state on a road surface in a basic pattern of the low beam light distribution pattern.
Figure 3B:
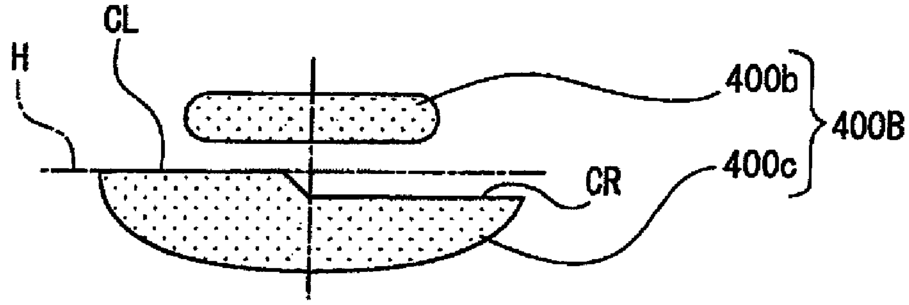
FIG. 3B shows a cutoff line layout of the basic pattern.
Figure 3C:
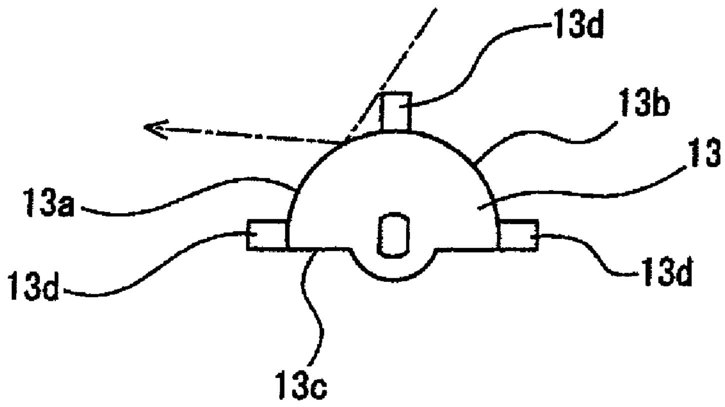
FIG. 3C shows a state of the rotary shade in the basic pattern.

FIGS. 3A through 3C relate to the basic pattern of the low beam light distribution pattern.

When the rotary shade 13 is rotated as shown in FIG. 3C, the basic pattern is formed. In the basic pattern, a cutoff line CL of the light distribution pattern 400B is coincident with the horizontal line H and a cutoff line CR of the light distribution pattern 400B is positioned below the horizontal line H.

The light emitted from the light source 11 is partially reflected by the first reflecting surface 13*a* of the rotary shade 13, and the reflected light is irradiated on a forward part through the projection lens 9 so that a second irradiation pattern 400*b* (referred to as a so-called overhead sign pattern) for lighting a road sign is formed.

Accordingly, the light distribution pattern 400B includes a first irradiation pattern 400*c* for mainly lighting the road surface 200 and the second irradiation pattern 400*b* formed above the first irradiation pattern 400*c* and serving to mainly irradiate light on the road sign. The second irradiation pattern 400*b* is formed to be an oblong pattern in order to irradiate light on the road sign positioned at a short distance and an irradiation luminance thereof is set to be low.

Figure 4A:
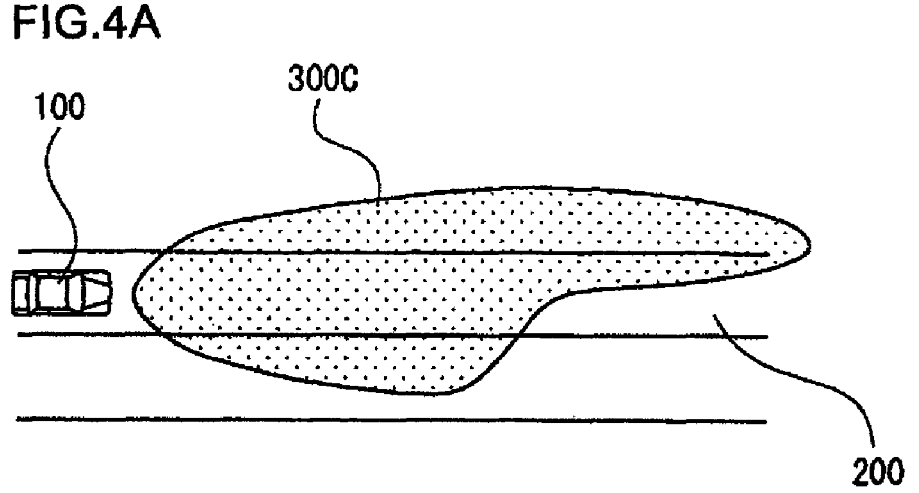
FIG. 4A shows an irradiating state on a road surface in a motorway pattern of the low beam light distribution pattern.
Figure 4B:
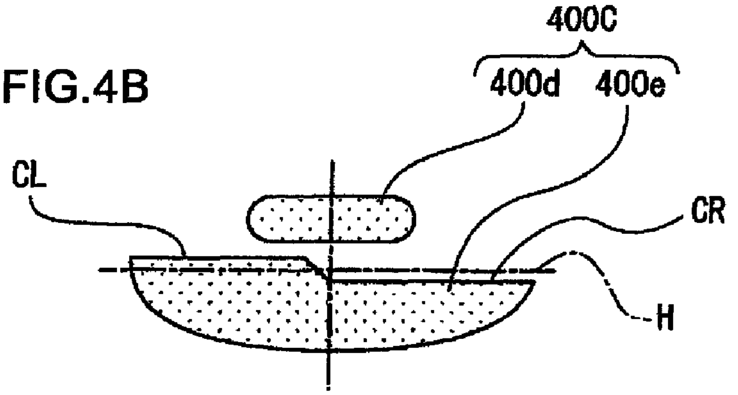
FIG. 4B shows a cutoff line layout of the motorway pattern.
Figure 4C:
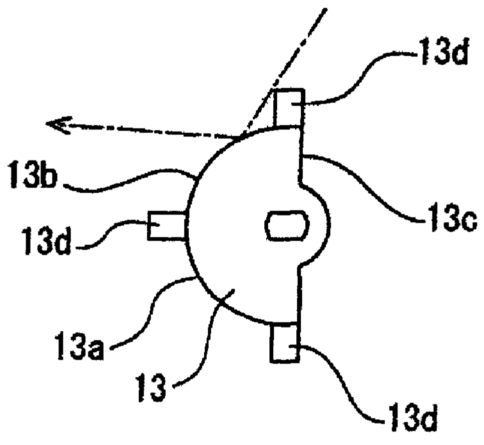
FIG. 4C shows a state of the rotary shade in the motorway pattern.

FIGS. 4A through 4C relates to the motorway pattern of the low beam light distribution pattern.

When the rotary shade 13 is rotated as shown in FIG. 4C, the motorway pattern is formed. In the motorway pattern, a cutoff line CL of the light distribution pattern 400C is positioned above the horizontal line H and a cutoff line CR of the light distribution pattern 400C is positioned below the horizontal line H.

The light emitted from the light source 11 is partially reflected by the second reflecting surface 13*b* of the rotary shade 13, and the reflected light is irradiated on a forward part through the projection lens 9 so that a second irradiation pattern 400*d* (referred to as a so-called overhead sign pattern) for lighting a road sign is formed.

Accordingly, the light distribution pattern 400C includes a first irradiation pattern 400*e* for mainly lighting the road surface 200 and the second irradiation pattern 400*d* formed above the first irradiation pattern 400*e* and serving to mainly irradiate light on the road sign. The second irradiation pattern 400*d* is formed to be a pattern having a smaller lateral length than the second irradiation pattern 400*b* in a basic pattern in order to irradiate light on a road sign positioned at a long distance and an irradiation luminance thereof is set to be high.

Figure 5A:
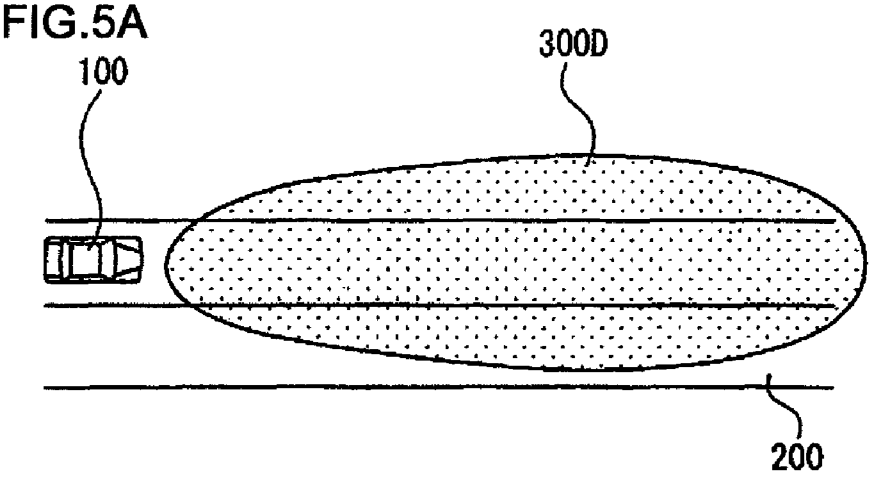
FIG. 5A shows an irradiating state on a road surface in a high beam light distribution pattern.
Figure 5B:
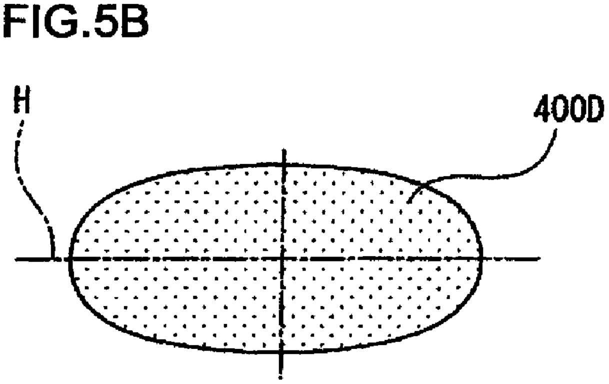
FIG. 5B shows a cutoff line layout of the high beam pattern.
Figure 5C:
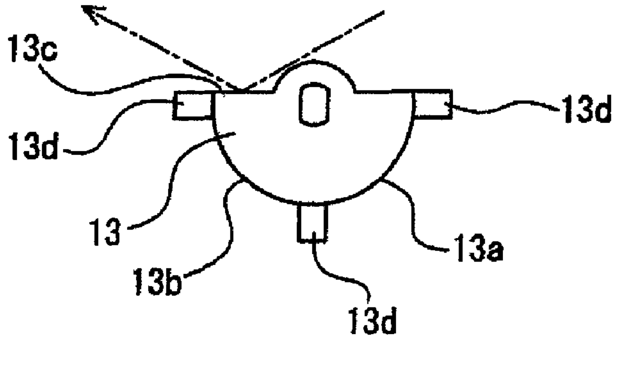
FIG. 5C shows a state of the rotary shade in the high beam pattern.

FIGS. 5A through 5C relate to the high beam pattern.

When the rotary shade 13 is rotated as shown in FIG. 5C, the high beam pattern is formed.

In the high beam pattern, the upper part and lower part of the light distribution pattern 400D are formed continuously both sides of a vertical direction of the horizontal line H are irradiated.

The light emitted from the light source 11 is partially reflected by the third reflecting surface 13*c* of the rotary shade 13, and a part of the light distribution pattern 400D is formed by the reflected light.

In the high beam distribution pattern, light is mainly irradiated on the road sign by light on an upper side of the light distribution pattern 400D, and the other light is mainly irradiated on the road surface 200 in the light distribution pattern 400D.

As described above, in the headlamp 1 for the vehicle, the rotary shade 13 is provided with the pattern forming sections for forming the light distribution patterns to be switched depending on the running state of the vehicle 100, and the second irradiation patterns 400*b* and 400*d* for mainly irradiating light on the road sign have the patterns to be varied depending on the running state of the vehicle 100.

That is, the light distribution patterns formed by the rotary shade 13 each respectively includes an upper part irradiation pattern 400*b*, 400*d*, and a lower part irradiation pattern 400*a*, 400*c*, 400*e*. A center of the lower part irradiating patterns is located lower than a horizontal line, and a center of the upper part irradiating patterns is located upper than the horizontal line. Further, the pattern forming sections form at least four different upper part irradiating patterns, namely, (1) a completely shielded pattern which does not irradiate the upper part (town pattern);

(2) a first pattern which irradiates a part of the upper part (basic pattern);

(3) a second pattern which irradiates a part of the upper part and is different from the first pattern (motorway pattern); and (4) a full irradiating pattern which irradiates wide range of the upper part (high beam pattern).

Accordingly, in addition to the patterns in which the upper part is fully irradiated and the upper part is not completely irradiated, there are provided at least two upper part irradiating patterns with respect to one of the lower part irradiating pattern, it is possible to enhance a visibility for the road sign irrespective of the running state of the vehicle 100.

Moreover, there are formed the second irradiation patterns 400*b* and 400*d* to be varied depending on the running state of the vehicle 100. Therefore, it is possible to prevent a dazzling light from being generated for other vehicles.

Although the four patterns depending on the running state have been described as an example of the light distribution pattern, the light distribution pattern is not restricted to the four patterns, and the number of the light distribution patterns can be set to more than four.

Although the description has been given to an example in which the second irradiation pattern is formed in the basic pattern and the motorway pattern, it is also possible to form the second irradiation pattern in the town pattern, for example.

For example, it is adaptable to configure the rotary shade to be able to form five light distribution patterns and four upper part irradiating patterns. In this case, one upper part irradiating pattern is commonly used for two different light distribution patterns.

While the invention has been described in connection with the exemplary embodiments, it will be obvious to those skilled in the art that various changes and modifications may be made therein without departing from the present invention. It is aimed, therefore, to cover in the appended claim all such changes and modifications as fall within the true spirit and scope of the present invention.

What is claimed is:

1. A headlamp for a vehicle comprising:

a projection lens;

a light source disposed behind a rear focal point of the projection lens and having an optical axis extending in a longitudinal direction;

a reflector which reflects light from the light source toward the projection lens; and a rotary shade which is rotatable and shields a part of the light projected from the light source and reflected by the reflector, wherein the rotary shade comprises a plurality of pattern forming sections, each of which respectively forms a corresponding light distribution pattern including an upper part irradiation pattern and a lower part irradiation pattern, wherein a center of the lower part irradiating patterns is located lower than a horizontal line, and wherein a center of the upper part irradiating patterns is located above the horizontal line.

2. The headlamp according to claim 1, wherein the pattern forming sections form at least four different upper part irradiating patterns.

3. The headlamp according to claim 1, wherein the respective pattern forming sections of the rotary shade comprises a plurality of projections and reflecting surfaces, both of which extend in a rotary axis thereof and are provided along a circumferential direction thereof, wherein each of the respective projections shields a part of the light emitted from the light source to form the respective lower part irradiating patterns, wherein each of the respective reflecting surfaces reflects a part of the light emitted from the light source to form the respective upper part irradiating patterns, and wherein respective pairs of the projection and the reflecting surface form the respective light distribution patterns.

4. The headlamp according to claim 1, wherein the respective upper part irradiation patterns in the light distribution patterns are different from each other.

5. The headlamp according to claim 1, wherein the light distribution patterns are switched in accordance with a running state of the vehicle.

6. The headlamp according to claim 2, wherein the at least four different upper part irradiating patterns comprise:

(1) a completely shielded pattern which does not irradiate any of an upper part;

(2) a first pattern which irradiates a part of the upper part;

(3) a second pattern which irradiates a part of the upper part and is different from the first pattern; and (4) a full irradiating pattern which irradiates a wide range of the upper part.

7. A method of manufacturing a headlamp for a vehicle comprising:

disposing a light source behind a rear focal point of a projection lens, wherein the light source has an optical axis extending in a longitudinal direction;

arranging a reflector to reflect light from the light source toward the projection lens; and disposing a plurality of pattern forming sections on a rotary shade, wherein each of the plurality of pattern forming sections respectively forms a corresponding light distribution pattern including an upper part irradiation pattern and a lower part irradiation pattern;

rotatably disposing the rotary shade so as to shield a part of the light projected from the light source and reflected by the reflector, wherein a center of the lower part irradiating patterns is located lower than a horizontal line, and wherein a center of the upper part irradiating patterns is located above the horizontal line.

8. The method of manufacturing a headlamp according to claim 7, wherein the pattern forming sections form at least four different upper part irradiating patterns.

9. The method of manufacturing a headlamp according to claim 7, wherein the respective pattern forming sections of the rotary shade comprises a plurality of projections and reflecting surfaces, both of which extend in a rotary axis thereof and are provided along a circumferential direction thereof, wherein each of the respective projections shields a part of the light emitted from the light source to form the respective lower part irradiating patterns, wherein each of the respective reflecting surfaces reflects a part of the light emitted from the light source to form the respective upper part irradiating patterns, and wherein respective pairs of the projection and the reflecting surface form the respective light distribution patterns.

10. The method of manufacturing a headlamp according to claim 7, wherein the respective upper part irradiation patterns in the light distribution patterns are different from each other.

11. The method of manufacturing a headlamp according to claim 7, further comprising:

switching the light distribution patterns in accordance with a running state of the vehicle.

12. The method of manufacturing a headlamp according to claim 8, wherein the at least four different upper part irradiating patterns comprise:

(1) a completely shielded pattern which does not irradiate any of an upper part;

(2) a first pattern which irradiates a part of the upper part;

(3) a second pattern which irradiates a part of the upper part and is different from the first pattern; and (4) a full irradiating pattern which irradiates a wide range of the upper part.

13. A headlamp for a vehicle comprising:

a projection lens which projects light forward;

a light source disposed behind a rear focal point of the projection lens and having an optical axis extending in a longitudinal direction;

a reflector which reflects light from the light source toward the projection lens; and a rotary shade which is rotatable and shields a part of the light projected from the light source and reflected by the reflector, wherein the rotary shade comprises a plurality of pattern forming sections, each of which respectively forms a corresponding light distribution pattern including an upper part irradiation pattern and a lower part irradiation pattern, wherein a center of the lower part irradiating patterns is located lower than a horizontal line, wherein a center of the upper part irradiating patterns is located above the horizontal line, wherein the respective pattern forming sections of the rotary shade comprises a plurality of projections and reflecting surfaces, both of which extend in a rotary axis thereof and are provided along a circumferential direction thereof, wherein each of the respective projections shields a part of the light emitted from the light source to form the respective lower part irradiating patterns, wherein each of the respective reflecting surfaces reflects a part of the light emitted from the light source to form the respective upper part irradiating patterns, wherein respective pairs of the projection and the reflecting surface form the respective light distribution patterns, wherein the respective upper part irradiation patterns in the light distribution patterns are different from each other, and wherein the light distribution patterns are switched in accordance with a running state of the vehicle.

14. The headlamp according to claim 13, wherein the pattern forming sections form at least four different upper part irradiating patterns.

15. The headlamp according to claim 14, wherein the at least four different upper part irradiating patterns comprise:

(1) a completely shielded pattern which does not irradiate any of an upper part;

(2) a first pattern which irradiates a part of the upper part;

(3) a second pattern which irradiates a part of the upper part and is different from the first pattern; and (4) a full irradiating pattern which irradiates a wide range of the upper part.

* * * * *